(12) United States Patent
Medina, III

(10) Patent No.: US 8,487,875 B1
(45) Date of Patent: Jul. 16, 2013

(54) SYSTEMS AND METHODS FOR ENTERING DATA INTO ELECTRONIC DEVICE WITH MINIMALLY-FEATURED KEYBOARD

(75) Inventor: Reynaldo Medina, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 676 days.

(21) Appl. No.: 11/877,981

(22) Filed: Oct. 24, 2007

(51) Int. Cl.
*G06F 3/02* (2006.01)

(52) U.S. Cl.
USPC .......................... 345/169; 345/168; 715/780

(58) Field of Classification Search
USPC .................. 345/156–184; 715/224, 226, 764, 715/780
See application file for complete search history.

(56) References Cited

U.S. PATENT DOCUMENTS

| | | | | |
|---|---|---|---|---|
| 4,786,768 | A * | 11/1988 | Langewis et al. | 200/6 A |
| 5,929,849 | A * | 7/1999 | Kikinis | 725/113 |
| 7,779,403 | B2 * | 8/2010 | Kao et al. | 717/169 |
| 2003/0226118 | A1 * | 12/2003 | Lee | 715/542 |
| 2005/0021625 | A1 * | 1/2005 | Fujimura et al. | 709/204 |
| 2006/0217144 | A1 * | 9/2006 | Bonnelykke Kristensen et al. | 455/550.1 |
| 2006/0223503 | A1 * | 10/2006 | Muhonen et al. | 455/414.1 |
| 2006/0230344 | A1 | 10/2006 | Jennings et al. | |
| 2007/0033647 | A1 * | 2/2007 | Yang et al. | 726/18 |
| 2007/0190568 | A1 * | 8/2007 | Hodge | 435/6 |
| 2007/0209016 | A1 * | 9/2007 | Takayama et al. | 715/780 |
| 2007/0282974 | A1 * | 12/2007 | Nagoshi et al. | 709/217 |
| 2009/0015556 | A1 * | 1/2009 | Kazmi | 345/159 |

OTHER PUBLICATIONS

"Predictive Text Entry definition"; as viewed on Oct. 18, 2007; http://www.cellaz.com/glossary/35/predictive-text-entry-definition/; Copyright 2003-2007 Internet Media, LLC.
"New Cell Phone Keypad Matrix Enables Super-Fast Text Entry"; as viewed on Oct. 18, 2007; http://www.wirelessdevnet.com/newswireless/jun252003.html; Copyright 2000-2007 MindSites Group, LLC.
"How do I sign in to my Yahoo! Photos on my phone?" Yahoo! Mobile; as viewed on Oct. 18, 2007; http://help.yahoo.com/l/us/yahoo/mobile/photo/photo-133772.html; Copyright 2007 Yahoo!.
Miller, Paul; "Stanford's EyePassword Helps Fight "Shoulder-Surfking" At the ATM"; Engadget; as viewed on Oct. 18, 2007; http://www.engadget.com/2007/08/21/stanfords-eyepassword-helps-fight-shoulder-surfing-at-the-atm/; Copyright 2003-2007 Weblogs, Inc.

* cited by examiner

*Primary Examiner* — Dmitriy Bolotin
(74) *Attorney, Agent, or Firm* — Brooks, Cameron & Huebsch, PLLC

(57) ABSTRACT

A user has a computing device with a minimally-featured keyboard and a display and employs such keyboard to enter text characters into the device. The user commands the device to navigate to a text field, and the device actuates a character entry application to assist the user. The character entry application presents in the display one of a strip of characters and a character box of characters that can be scrolled through by the user to select a particular one of the characters. The user scrolls through the characters by way of first predetermined keys on the keyboard, and selects a scrolled-to character by way of a second predetermined key on the keyboard. Thereafter, the user views in the display a representation of the selected character in the text field.

21 Claims, 4 Drawing Sheets

SYSTEMS AND METHODS FOR ENTERING DATA INTO ELECTRONIC DEVICE WITH MINIMALLY-FEATURED KEYBOARD

CROSS-REFERENCE TO RELATED APPLICATION(S)

The present application is filed concurrently with and shares a common title and disclosure with the following applications, each of which is hereby incorporated herein by reference in its entirety:
U.S. patent application Ser. No. 11/877,990; and
U.S. patent application Ser. No. 11/877,998.

FIELD

The present disclosure is directed to systems and method that may be implemented to accurately enter data into an electronic device that does not have a more-or-less standard keyboard. More particularly, the present disclosure is directed to such systems and methods that allow a user to enter particularly sensitive data into the electronic device, such as a user identification (ID), a password, a security phrase, etc., without excessive error.

BACKGROUND

In most any electronic transaction, such as for example a bank transaction, a retail transaction, a data-access transaction, or the like, a user employing a computing device obtains access to some protected account or space or the like by way of entering security information into the computing device such as a user ID, a password, etc. as authentication that the user is in fact entitled to such access. Doing so by way of a keyboard or the like that is associated with the computing device is a relatively simple matter, especially if the keyboard includes the characters needed by the user to form the security information, and if the characters are available from the keyboard in a readily accessible form. However, if the characters are not available from the keyboard of the computing device, or are available from the keyboard in a form that is not readily accessible, then the process of entering such security information into the computing device can become more difficult.

One example of a computing device with a full-featured keyboard is a laptop computer or a personal computer with a generally known 100+ key keyboard that includes the English alphabet, the numbers 0-9, and many special characters such as '@', '^', '*', '(',')', etc. Notably, with such a full-featured keyboard, entering text such as a password is a relatively simple matter, even when each character of entered text is obscured on an associated display of the computing device, such as is often the case when entering such password.

In contrast, one example of a computing device with a minimally-featured keyboard is a mobile device such as a cellular telephone with the numbers 0-9, the special characters '*' and '#', and perhaps a few other keys. Notably, with such a minimally-featured keyboard, entering text such as a password can be performed, although with some effort and in a somewhat limited manner, typically by actuating a particular number key one or more times to select a particular letter. However, when each character of entered text is obscured on an associated display of the mobile device, it has been found that employing such a method to enter a character oftentimes results in the character being entered incorrectly. Worse yet, such incorrectly entered character in a password or other security information is undetectable until access is denied based thereon.

Despite having such a minimally-featured keyboard, many if not most mobile devices such as cellular telephones are equipped with a browser or the like and the associated functionality to access information by way of an inter-computer network such as the Internet. Likewise, many if not most users of such mobile devices do in fact employ such mobile devices to access such information by way of the Internet or the like. However, users of such mobile devices with such minimally-featured keyboards do not normally experience optimal satisfaction results when using such minimally-featured keyboards to access protected web sites. As was set forth above, such users are not satisfied when entering text including obscured text such as a password, for the reason that entering such text by way of the minimally-featured keyboard has been found to be cumbersome, and often results in improperly entered text.

Accordingly, a need exists for systems and methods for accurately entering security-related and non-security-related text into a field within a browser or the like on a mobile device such as a cellular telephone or the like by way of a minimally-featured keyboard associated with the mobile device. More particularly, a need exists for such systems and methods that employ a software application in connection with the browser to allow a user to accurately select each character of text to be entered into the field, and to display the character to the user prior to selection of such character by such user.

SUMMARY

The aforementioned needs are satisfied at least in part by systems and methods with regard to a user having a computing device with a minimally-featured keyboard and a display and employing the minimally-featured keyboard to enter text characters into the device within a text field in a browser shown on the display of the device. The user commands the device to navigate to the text field, and the device in response thereto actuates a character entry application to assist the user in entering the text characters into such text field.

The character entry application presents in the display one of a strip of characters and a character box of characters that can be scrolled through by the user to select a particular one of the characters. The user scrolls through the characters by way of first predetermined keys on the keyboard of the device, and selects a scrolled-to character by way of a second predetermined key on the keyboard. Thereafter, the user views in the display a representation of the selected character in the text field.

BRIEF DESCRIPTION OF THE DRAWINGS

The foregoing summary, as well as the following detailed description of various embodiments of the present invention, will be better understood when read in conjunction with the appended drawings. For the purpose of illustrating the embodiments, there are shown in the drawings embodiments which are presently preferred. As should be understood, however, the embodiments of the present invention are not limited to the precise arrangements and instrumentalities shown. In the drawings.

DETAILED DESCRIPTION

Example Computing Environment

Figure 1:
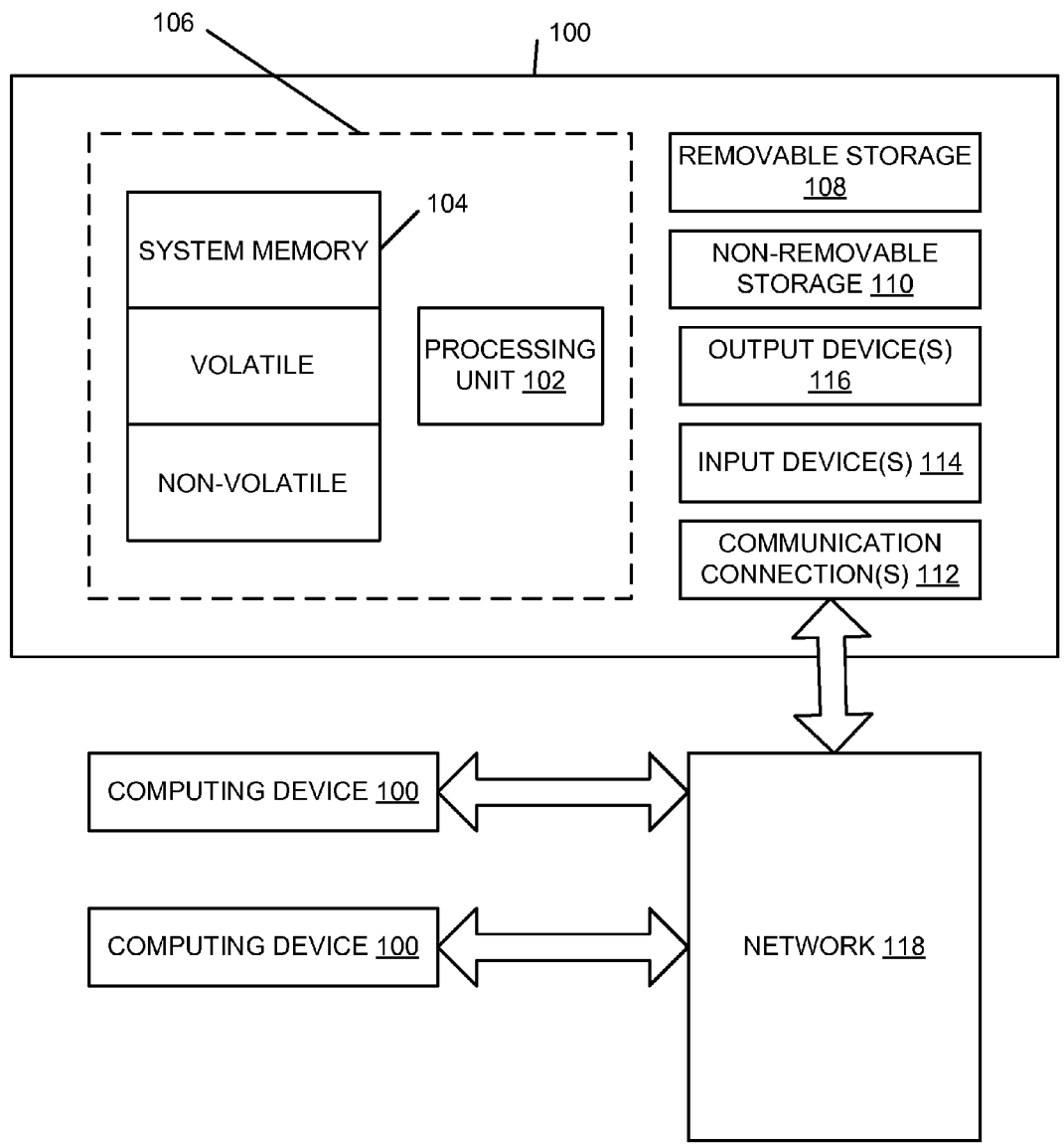
FIG. 1 is a block diagram of an example of a computing environment within which various embodiments of the present invention may be implemented.

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Mobile Device

Figure 2:
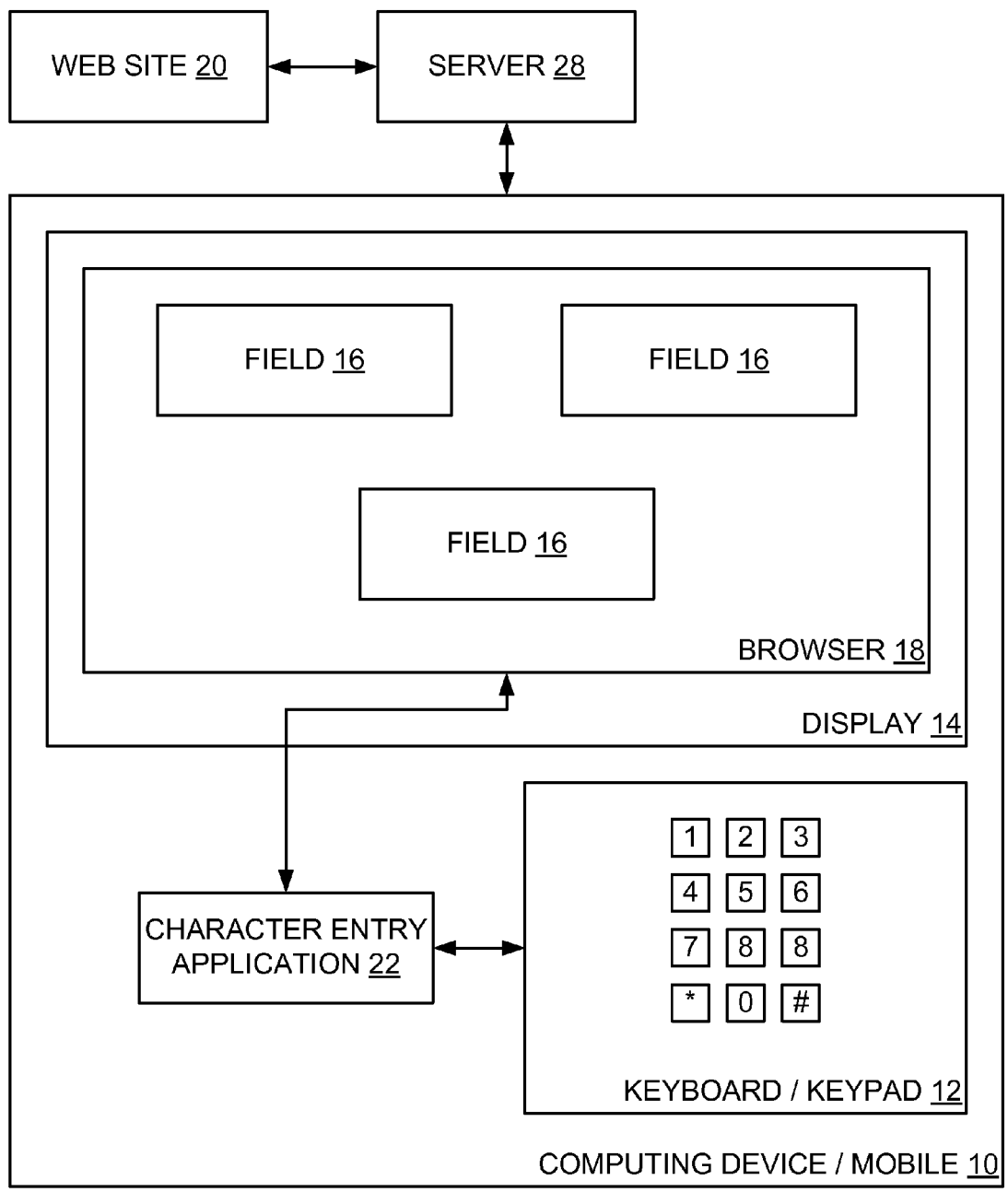
FIG. 2 is a block diagram of a system including a mobile of a user with a character entry application that enters characters into a field of a browser in a display on the mobile in accordance with various embodiments of the present invention.

In various embodiments of the present invention as set forth herein, and referring now to FIG. 2, a user has a device 10 with a minimally-featured keyboard 12 and a display 14 and employs the minimally-featured keyboard 12 to accurately enter text characters into such device 10 for display within a field 16 in a browser 18 shown on the display 14 of the device 10. Such device 10 may be any appropriate device without departing from the spirit and scope of the present invention. For example, the device 10 may be a mobile device such as a cellular telephone (hereinafter, 'mobile 10'), and the minimally-featured keyboard 12 of the mobile 10 may be the typical keypad (hereinafter, 'keypad 12') with the numbers 0-9, the special characters '*' and '#', and perhaps a few other keys. As will be understood, the various embodiments of the present invention also may be employed with a mobile or other device 10 that has a full-featured keyboard, although such full-featured keyboard may at times obviate the need such various embodiments.

Typically, and as was set forth above, with such a minimally-featured keypad 12, entering text such as a password or other security information into a field 16 of a browser 18 on the display 14 of the mobile 10 can be performed, although with some effort and in a somewhat limited manner, typically by actuating a particular number key one or more times to select a particular letter. For example, upon placing a cursor or the like into the field 16, the number '5' may be actuated two times in succession to enter 'k', while the number '8' may be actuated three times in succession to enter 'v'. However, in doing so, care must be taken to actuate the same key the proper number of times in succession. Otherwise, the wrong character is entered. Note, too, that if the wrongly entered character is obscured or otherwise hidden from direct view, such as may be the case when the character is part of a password or other security information or the like, the wrongly entered character is not discovered until access is denied based thereon. Even then, no indication is usually provided as to the identification of the wrongly entered character. As a result, correctly entering text by way of the keypad 12 has been found to be cumbersome and tiring, and a user of such mobile 10 with such minimally-featured keypad 12 does not normally experience optimal satisfaction results when using such minimally-featured keypad 12, especially to access a security-protected web site 20 by way of the browser 18 of the mobile 10.

Character-Entry Application for Mobile 10

In various embodiments of the present invention, then, characters of text may be entered into any type of mobile 10 or other device 10 even if such mobile 10 only has the aforementioned minimally-featured keypad 12. In particular, and in such embodiments, when a user of such a mobile 10 navigates to a text field 16 or the like in a browser 18 on a display 14 of the mobile 10, a character-entry application 22 (FIG. 2) is actuated to assist the user in entering characters of text into such text field 16. Notably, such an application 22 may be any appropriate character-entry application without departing from the spirit and scope of the present invention, presuming of course that the application 22 imparts the requisite functionality. For example, the application 22 may be resident on the mobile 10 and called by the browser 18 in the manner of a 'browser plug-in' when character entry into a text field 16 is required. Alternately, the application 22 may take the form of executable code or the like that is downloaded to the browser 18 along with a page within which the text field 16 resides.

In various embodiments of the present invention, the application 22 is characterized as displaying a list of characters that can be scrolled through by the user to select a particular one of the characters. For one example, and referring now to FIG. 3, the characters may appear in a strip 24 on a bottom (shown in FIG. 3), top, or side edge of the display 14 of the mobile 10, scrolling through the strip 24 of characters occurs by way of using appropriate directional keys on the keypad 12 of the mobile 10, and selection of a character from the strip 24 occurs by way of using an appropriate selection key on the keypad 12 of the mobile 10. Alternately, if directional keys are not available, appropriate ones of the number keys on the keypad 12 may be applied both to scroll and select from among the characters in the strip.

Figure 3:
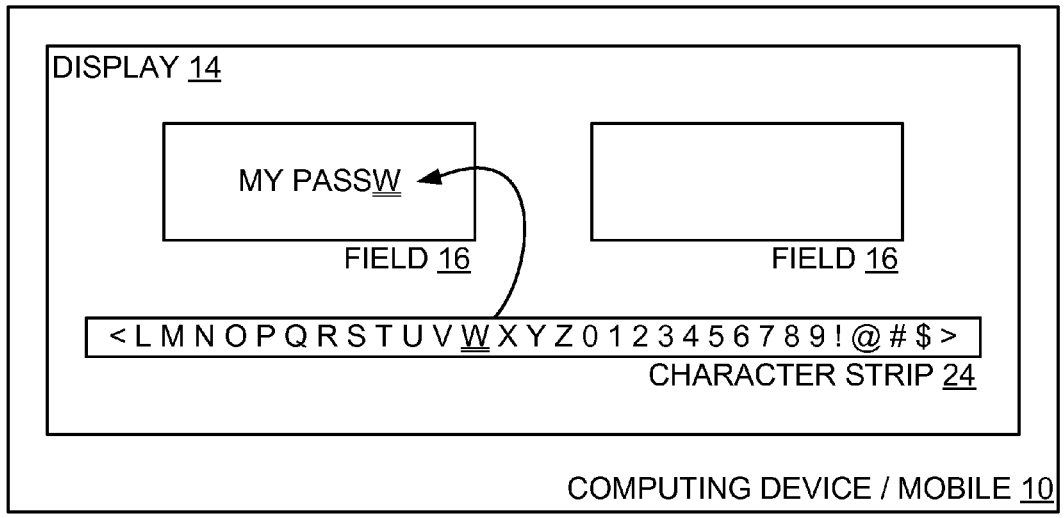
FIG. 3 is a block diagram showing the display of the mobile of FIG. 2, where the character entry application employs a strip in accordance with various embodiments of the present invention.

Particularly with regard to the strip 24 of the application 22 of FIG. 3 and the situation where the mobile 10 does not have directional keys, although by no means so limited, the user can scroll to a character to the left in the strip 24 by actuating '4' on the keypad 12 of the mobile 10, and likewise can scroll to a character to the right the strip 24 by actuating '6' on the keypad 12 of the mobile 10. In either case, and as may be appreciated, scrolling to a particular character in effect moves a highlight or other emphasis from one character to the next in the direction of the scroll. Once the user has scrolled to a character of interest and has highlighted/emphasized same, the user can select that number or letter by actuating '#' on the keypad 12 of the mobile 10, for example, after which the user can scroll and enter to select the next character for the field 16. Note here that in such an arrangement, it may be that the user can tab from one field to the next by actuating '1' on the keypad 12 of the mobile 10, especially if '1' is not associated with any characters.

Figure 4:
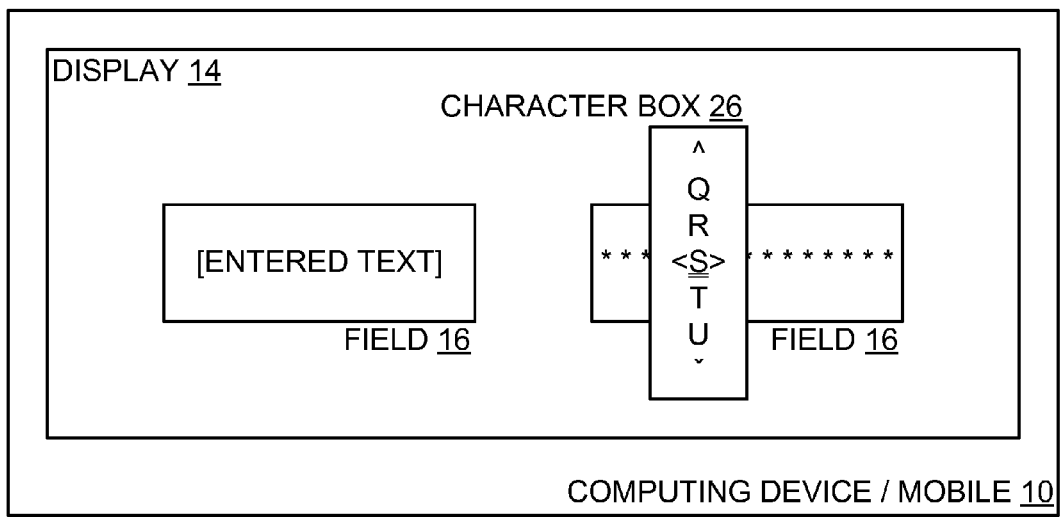
FIG. 4 is a block diagram showing the display of the mobile of FIG. 2, where the character entry application employs a character box in accordance with various embodiments of the present invention.

For another example, and referring now to FIG. 4, the characters may appear within a character box 26 in the field 16 within which the character is to be entered, where the character box 26 is surrounded by top, bottom, left, and right arrows, scrolling occurs by way of using appropriate directional keys on the keypad 12 of the mobile, and selection of a character from the strip 24 occurs by way of using other appropriate directional keys on the keypad 12 of the mobile 10 to opposingly move or shift to character to the left or right within the field 16, where the directional keys correspond to the arrows surrounding the character box 26. Alternately, and as before if directional keys are not available, appropriate ones of the number keys on the keypad 12 may be applied both to scroll and select in a manner similar to the aforementioned directional keys. Note here that scrolling in connection with the embodiment shown in FIG. 4 is likely performed in a vertical manner, as opposed to the horizontal manner of FIG. 3, especially inasmuch as horizontal movement is likely required to shift emphasis to the character to the left or right within the field 16.

Particularly with regard to the character box 26 of the application 22 of FIG. 4 and the situation where the mobile 10 does not have directional keys, although by no means so limited, the user can scroll to a character above in the character box 26 by actuating '2' on the keypad 12 of the mobile 10, and likewise can scroll to a character below in the character box 26 by actuating '8' on the keypad 12 of the mobile 10. Similarly, once a desired character is arrived at by scrolling above or below, the user can shift emphasis to the next character to the right in the field 16 by actuating '6' on the keypad 12 of the mobile 10, and likewise can shift emphasis to the previous character to the left in the field 16 (to correct a noticed mistake, for example) by actuating '4' on the keypad 12 of the mobile 10. Once the user has entered all desired characters in the field 16, the user again can then tab from one field to the next by actuating '1' on the keypad 12 of the mobile 10, especially if '1' is not associated with any characters.

Note here that in any embodiment of the present invention, the other keys on the keypad 12 of the mobile 10 may be employed by the application 22 as necessary and/or desirable. For example, it may be that '3' is actuated to delete a character, while '0' is actuated as an 'ENTER' key, and '*' is actuated to toggle between character sets such as upper-case, lower-case, numbers, special characters, etc. Note, too, that in the event the characters are obscured in the field 16, such as for example if the field 16 is security-related, and in various embodiments of the present invention, selecting a particular character in the field 16 for scrolling de-obscures and thus shows such character. Similarly, selecting such character or shifting to another character, as the case may be, causes such character to be re-obscured.

Figure 5:
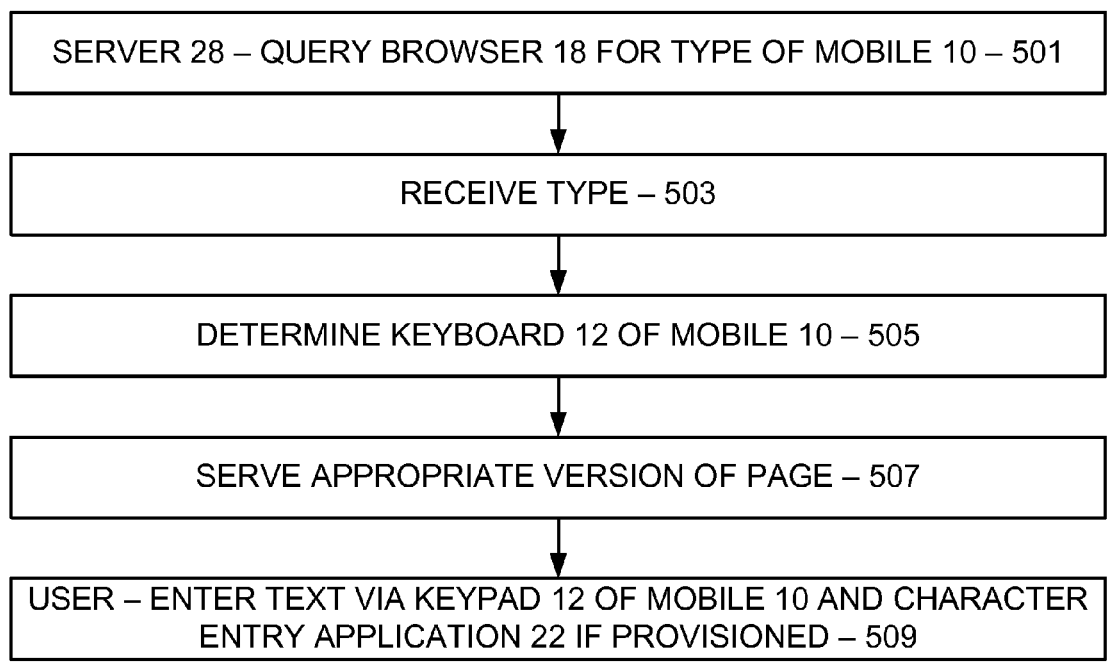
FIG. 5 is a flow diagram showing key steps performed when a server serves a page to the browser of FIG. 2 in accordance with various embodiments of the present invention.

As may be appreciated, regardless of whether the strip 24 of FIG. 3, the character box 26 of FIG. 4, or some other entry mechanism is employed as a character entry application 22 in accordance with various embodiments of the present invention, a server 28 (FIG. 2) serving a page from a web site 20 to the browser 18 should be aware that the mobile 10 employs such a character entry application 22. Accordingly, and referring now to FIG. 5, in various embodiments of the present invention, the server 28 prior to serving such page queries the browser 18 for an identification of the type of mobile 10 (step 501), and the browser 18 returns same to the server 28 (step 503). Such identification may be any type of identification without departing from the spirit and scope of the present invention. For example, the identification may be of the brand and model of the mobile, in which case the server 28 can refer to a database or the like to identify the capabilities of the mobile 10. Alternatively, the identification may be the capabilities of the mobile 10 themselves.

In either instance, the server 28 determines whether the mobile 10 has a full-featured keyboard 12, a minimally-featured keyboard 12 with directional keys, a minimally-featured keyboard 12 without directional keys, etc. (step 505), and based thereon serves an appropriate version of the page (step 507). Thus, if the mobile 10 has a full-featured keyboard 12, the served page may not make any provision for using a character entry application 22, while a minimally-featured keyboard 12 with or without directional keys may result in a served page that makes some sort of appropriate provision for using such a character entry application 22. At any rate, based on the served page, the user enters information into fields 16 on the page by way of the keyboard or keypad 12 of the mobile 10 and any provisioned character entry application 22, and employs the page as may be appropriate (step 509). As was set forth above, if using such a character entry application 22, the server 28 may serve the page to include the application 22, serve the page to call the mechanism as already resident on the mobile, or the like.

CONCLUSION

The programming believed necessary to effectuate the processes performed in connection with the various embodiments of the present invention is relatively straight-forward and should be apparent to the relevant programming public. Accordingly, such programming is not attached hereto. Any particular programming, then, may be employed to effectuate the various embodiments of the present invention without departing from the spirit and scope thereof.

In the various embodiments of the present invention, systems and methods are provided for accurately entering security-related and non-security-related text into a field 16 within a browser 18 or the like on a mobile 10 such as a cellular telephone or the like by way of a minimally-featured keyboard 12 associated with the mobile 10. A software application 22 is employed in connection with the browser 18 to allow a user to accurately select each character of text to be entered into the field 16, and to display the character to the user prior to selection of such character by such user.

It should be appreciated that changes could be made to the embodiments described above without departing from the inventive concepts thereof. As but one example, although the various embodiments of the present invention are set forth primarily in terms of a device 10 such as a mobile or cellular telephone 10, the device 10 may be a non-mobile device, and may be a device other than a cellular telephone. For example, the device 10 may be a personal computer, a laptop computer, a personal data assistant, an automated teller machine, a land-line telephone set, etc. It should be understood, therefore, that this invention is not limited to the particular embodiments disclosed, but it is intended to cover modifications within the spirit and scope of the present invention as defined by the appended claims.

What is claimed:

1. A method with regard to a computing device with a minimally-featured keyboard and a display and employing the minimally-featured keyboard to enter text characters into the device within a text field in a browser shown on the display of the device, the method comprising the device:

sending an indication to a server that the computing device includes the minimally-featured keyboard;

receiving a page including a character box, from the server to display on the browser, to enter text characters from the character box into the device using the minimally-featured keyboard to select text characters from the character box in response to the indication that the computing device includes the minimally-featured keyboard;

receiving a command to navigate to the text field;

actuating a character entry application to assist in entering the text characters into such text field, the character entry application presenting in the display one of a strip of characters and a character box of characters that can be scrolled through to select a particular one of the characters, scrolling through the characters by way of first predetermined keys on the keyboard of the device, wherein the first predetermined keys are number keys on the keyboard, and selecting a scrolled-to character by way of a second predetermined key on the keyboard, wherein the second predetermined key is a number key on the keyboard;

presenting a representation of the selected character in the text field;

navigating to another character in the text field by actuating a third predetermined key of the keyboard; and navigating to another text field by actuating a fourth predetermined key of the keyboard.

2. The method of claim 1 wherein the character entry application is employed to enter security information into the text field, and wherein presenting the representation of the selected character in the text field comprises obscuring the selected character within the text field.

3. The method of claim 1 wherein the computing device comprises a cellular telephone having a keypad.

4. The method of claim 1 wherein the character entry application is one of resident on the device as a browser plug-in called when character entry into any text field is required, and executable code downloaded to the browser along with a page within which the text field resides.

5. The method of claim 1 wherein the method includes scrolling through the characters by way of predetermined character keys on the keyboard of the device, and selecting the scrolled-to character by way of one of an entry key on the keyboard and a predetermined character key on the keyboard of the device.

6. The method of claim 1 wherein the method includes scrolling through the characters by way of the first keys and selecting the scrolled-to character by way of the second key a plurality of times to enter a plurality of characters of text into the text field, viewing a representation of all of the entered characters in the text field, and finishing entering characters into the text field by actuating a third predetermined key on the keyboard.

7. The method of claim 1 wherein the method includes entering a plurality of characters of text into the text field, wherein the character entry application presents the character box of characters that can be scrolled through to select the particular one of the characters, scrolling through the characters by way of the first keys, and selecting the scrolled-to character by way of second predetermined keys which also allow moving among the plurality of characters of text in the text field.

8. A non-transitory computer-readable medium having computer-executable instructions thereon for implementing a method with regard to a computing device with a minimally-featured keyboard and a display and employing the minimally-featured keyboard to enter text characters into the device within a text field in a browser shown on the display of the device, the method comprising the device:

sending an indication to a server that the computing device includes the minimally-featured keyboard;

receiving a page including a character box, from the server to display on the browser, to enter text characters from the character box into the device using the minimally-featured keyboard to select text characters from the character box in response to the indication that the computing device includes the minimally-featured keyboard;

receiving a command to navigate to the text field;

actuating a character entry application to assist in entering the text characters into such text field, the character entry application presenting in the display one of a strip of characters and a character box of characters that can be scrolled through to select a particular one of the characters, scrolling through the characters by way of first predetermined keys on the keyboard of the device, wherein the first predetermined keys are number keys on the keyboard, and selecting a scrolled-to character by way of a second predetermined key on the keyboard, wherein the second predetermined key is a number key on the keyboard;

presenting a representation of the selected character in the text field;

navigating to another character in the text field by actuating a third predetermined key of the keyboard; and navigating to another text field by actuating a fourth predetermined key of the keyboard.

9. The medium of claim 8 wherein the character entry application is employed to enter security information into the text field, and wherein presenting the representation of the selected character in the text field comprises obscuring the selected character within the text field.

10. The medium of claim 8 wherein the computing device comprises a cellular telephone having a keypad.

11. The medium of claim 8 wherein the character entry application is one of resident on the device as a browser plug-in called when character entry into any text field is required, and executable code downloaded to the browser along with a page within which the text field resides.

12. The medium of claim 8 wherein the method includes scrolling through the characters by way of predetermined character keys on the keyboard of the device, and selecting the scrolled-to character by way of one of an entry key on the keyboard and a predetermined character key on the keyboard of the device.

13. The medium of claim 8 wherein the method includes scrolling through the characters by way of the first keys and selecting the scrolled-to character by way of the second key a plurality of times to enter a plurality of characters of text into the text field, viewing a representation of all of the entered characters in the text field, and finishing entering characters into the text field by actuating a third predetermined key on the keyboard.

14. The medium of claim 8 wherein the method includes entering a plurality of characters of text into the text field, wherein the character entry application presents the character box of characters that can be scrolled through select the particular one of the characters, scrolling through the characters by way of the first keys, and selecting the scrolled-to character by way of second predetermined keys which also allow moving among the plurality of characters of text in the text field.

15. A system with regard to a computing device with a minimally-featured keyboard and a display and employing the minimally-featured keyboard to enter text characters into the device within a text field in a browser shown on the display of the device, the system comprising with regard to the device:

a subsystem for sending an indication to a server that the computing device includes the minimally-featured keyboard;

a subsystem for receiving a page including a character box, from the server to display on the browser, to enter text characters from the character box into the device using the minimally-featured keyboard to select text characters from the character box in response to the indication that the computing device includes the minimally-featured keyboard;

a subsystem for receiving a command to navigate to the text field;

a subsystem for actuating a character entry application to assist in entering the text characters into such text field, the character entry application presenting in the display one of a strip of characters and a character box of characters that can be scrolled through to select a particular one of the characters, scrolling through the characters by way of first predetermined keys on the keyboard of the device, wherein the first predetermined keys are number keys on the keyboard, and selecting a scrolled-to character by way of a second predetermined key on the keyboard, wherein the second predetermined key is a number key on the keyboard;

a subsystem for presenting a representation of the selected character in the text field;

a subsystem for navigating to another character in the text field by actuating a third predetermined key of the keyboard; and a subsystem for navigating to another text field by actuating a fourth predetermined key of the keyboard.

16. The system of claim 15 wherein the character entry application is employed to enter security information into the text field, and wherein the subsystem for presenting the representation of the selected character in the text field comprises a subsystem for obscuring the selected character within the text field.

17. The system of claim 15 wherein the computing device comprises a cellular telephone having a keypad.

18. The system of claim 15 wherein the character entry application is one of resident on the device as a browser plug-in called when character entry into any text field is required, and executable code downloaded to the browser along with a page within which the text field resides.

19. The system of claim 15 wherein the subsystem for actuating includes scrolling through the characters by way of predetermined character keys on the keyboard of the device, and selecting the scrolled-to character by way of one of an entry key on the keyboard and a predetermined character key on the keyboard of the device.

20. The system of claim 15 wherein the subsystem for actuating includes scrolling through the characters by way of the first keys and selecting the scrolled-to character by way of the second key a plurality of times to enter a plurality of characters of text into the text field, viewing a representation of all of the entered characters in the text field, and finishing entering characters into the text field by actuating a third predetermined key on the keyboard.

21. The system of claim 15 wherein the subsystem for actuating includes entering a plurality of characters of text into the text field, wherein the character entry application presents the character box of characters that can be scrolled through to select the particular one of the characters, scrolling through the characters by way of the first keys, and selecting the scrolled-to character by way of second predetermined keys which also allow moving among the plurality of characters of text in the text field.

* * * * *